United States Patent [19]

Salonen

[11] Patent Number: 5,591,245
[45] Date of Patent: Jan. 7, 1997

[54] METHOD AND APPARATUS FOR DEVELOPING AND EDGE STRESS IN A WINDSHIELD IN A WINDSHIELD BENDING FURNACE

[75] Inventor: Tauno T. Salonen, Tampere, Finland

[73] Assignee: Tamglass Engineering Oy, Tampere, Finland

[21] Appl. No.: 332,466

[22] Filed: Oct. 31, 1994

Related U.S. Application Data

[63] Continuation of Ser. No. 39,480, filed as PCT/FI91/00327, Oct. 31, 1991, published as WO92/07800, May 14, 1992, abandoned.

[30] Foreign Application Priority Data

Nov. 1, 1990 [FI] Finland ................................. 905399

[51] Int. Cl.$^6$ ................................................ C03B 23/025
[52] U.S. Cl. ............................... 65/107; 65/106; 65/104; 65/103

[56] References Cited

U.S. PATENT DOCUMENTS

| | | | |
|---|---|---|---|
| 2,993,303 | 7/1961 | De Vore | 65/288 |
| 3,092,481 | 6/1963 | Carson | 65/288 |
| 3,102,802 | 9/1963 | Carson et al. | 65/288 |
| 3,137,558 | 6/1964 | Oberstar | 65/288 |
| 3,253,898 | 5/1966 | Leflet | 65/288 |
| 3,265,488 | 8/1966 | Ross et al. | 65/288 |
| 4,497,645 | 2/1985 | Peltonen | 65/107 |

FOREIGN PATENT DOCUMENTS

| | | |
|---|---|---|
| 0132701 | 2/1985 | European Pat. Off. . |
| 68390 | 12/1986 | Finland . |

*Primary Examiner*—Donald E. Czaja
*Assistant Examiner*—Calvin Padgett
*Attorney, Agent, or Firm*—Burns, Doane, Swecker & Mathis, LLP

[57] ABSTRACT

The invention relates to a method and apparatus for developing an edge stress in a windshield bending furnace. Adjacent to a ring mould is located a metallic, flat extra frame in a manner that the lower surface of a bent windshield remains at a small distance from extra frame. The compression stress of glass edge can be adjusted by varying the distance of extra frame from glass and/or by varying its glass-oriented dimension.

20 Claims, 2 Drawing Sheets

METHOD AND APPARATUS FOR DEVELOPING AND EDGE STRESS IN A WINDSHIELD IN A WINDSHIELD BENDING FURNACE

This application is a continuation of application No. 08/039,480, filed as PCT/FI91/00327, Oct. 31, 1991 published as WO92/07800, May. 14, 1992 now abandoned.

BACKGROUND AND SUMMARY

The present invention relates to a method for developing an edge stress in a windshield in a windshield bending furnace, wherein a glass sheet is supported on a ring mould and heated close to a softening temperature and, following a bending operation, the glass sheet is cooled at such a cooling rate that a compression stress is developed at least in the edge portion of the glass sheet.

The invention relates also to an apparatus for developing an edge stress in a windshield in a windshield bending furnace, the apparatus comprising a ring mould, the ring would support a glass sheet which is heated, bent and cooled.

A compression stress is desired to develop in the edge area of a windshield. This will make the glass more resistant to mechanical stresses, e.g., in robot-operated installations and to thermal stresses, applied to glass as a result of fluctuations of cold and hot air.

When producing long series of the same type of glass, the edge stress is provided by blasting cold air to the edge area after a bending operation. A problem in such mechanisms is that they have been designed for a certain type of glass and, when changing the glass type, they require the installation of a new blasting system, which takes a lot of time and halts production. Thus, this method cannot be applied to flexible production, wherein a glass design is changed often. One possible solution to the problem is set forth, e.g., in U.S. Pat. publication No. 4,871,385, which could also be applied to flexible production. However, this prior known mechanism is complicated and expensive.

An object of the invention is to provide a simple method and apparatus for developing an edge stress also in miscellaneous production.

BRIEF DESCRIPTION OF THE DRAWINGS

The invention will now be described in more detail with reference made to the accompanying drawings, in which.

DETAILED DESCRIPTION

Figure 1:
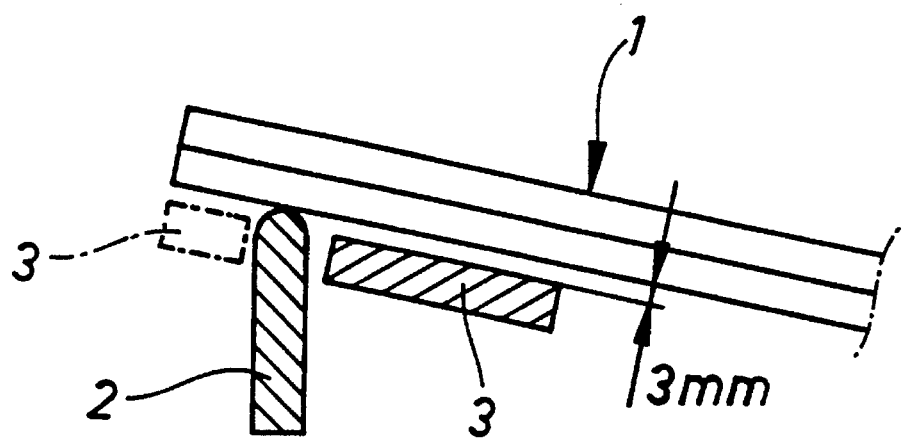
FIG. 1 shows a cross-section of the edge portion of an apparatus of the invention and FIG. 2 shows an apparatus of the invention in a plan view.
Figure 2:
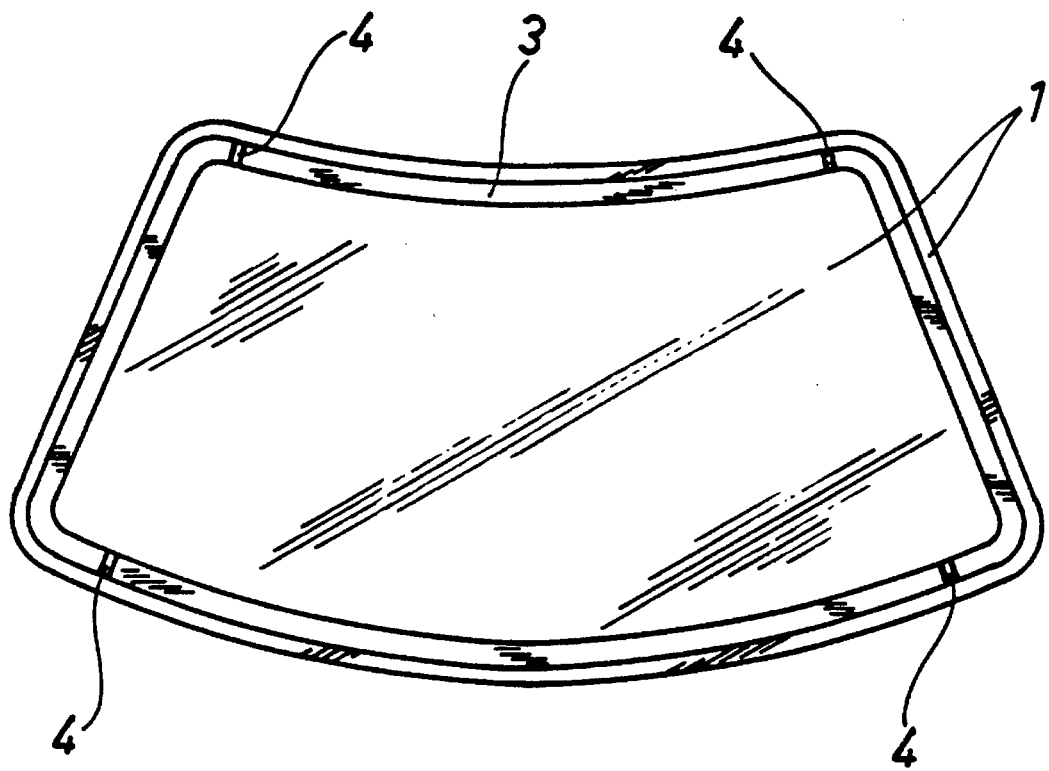
Figure 3:
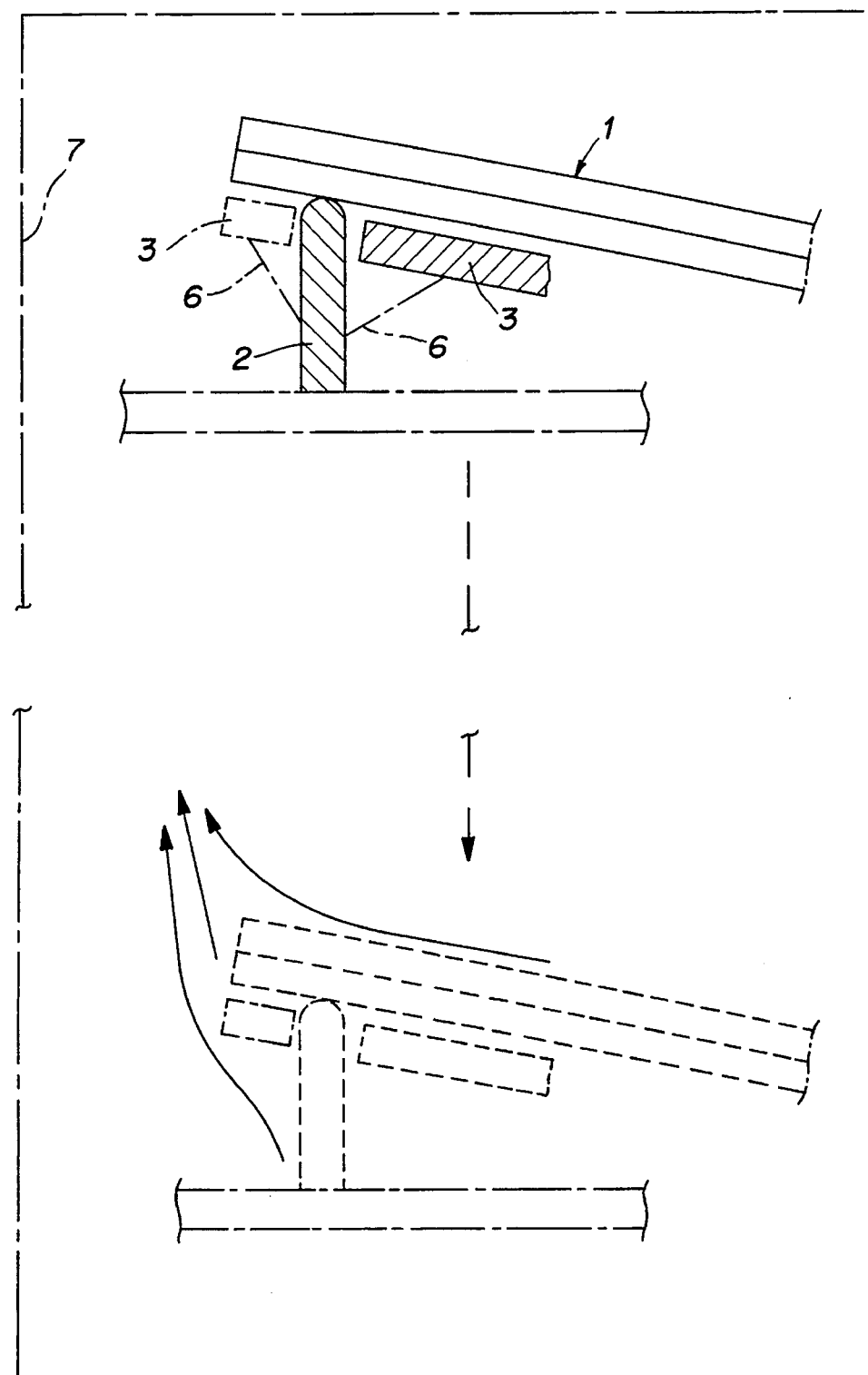
FIG. 3 is a schematic view of a portion of a furnace according to an embodiment of the invention.

The invention can be applied, e.g., in a furnace described in Patent publication FI 68390, which is cited as reference in terms of the structure and operating principle of the furnace. A furnace 7 is shown in phantom in FIG. 1. Of course, the invention can be applied in all types of furnaces intended for bending a windshield upon a ring mould.

Inside or outside the supporting frame of a ring mould 2 is placed a metallic extra frame 3, which can be fitted in position mouldwise in a manner that the lower surface of a bent windshield 1 does not come to contact with extra frame 3. At least during a heating operation, the temperature of the edge of the windshield 1 is affected by the metallic extra frame 3, which is located adjacent to the ring mould 2 and which does not contact the windshield. By virtue of extra frame 3 the edge of glass remains homothermal. The edge of the glass remains homothermal regardless of the shape of glass at appr. 600°–620° C. during a bending operation, which temperature is required for the development of an edge stress without affecting, however, the quality of final bending. Rapid cooling is effected, e.g., in a furnace described in Patent publication FI 68390 by using a hoist for carrying the glass along with its mould from a bending station to a lower pre-cooling station, the glass edge developing during this transfer a cooling flow which produces an edge stress. Other prior known and available cooling methods can of course be used just as well.

The distance of an edge stress from the glass edge, i.e., the width of an edge-stress zone, can be adjusted by varying the width and distance of extra frame 3. The variation of width can be effected either by replacing extra frame 3 with another or by adapting the extra frame 3 or the components thereof to be pivotable in a suitable manner so that the glass-oriented dimension of the frame is varied. The extra frame 3 can be made of frame components, linked to each other by means of hinges 4, whereby one and the same extra frame can be used for bending windshields 1 having somewhat different degrees of curvature. Adjustment of the distance of extra frame 3 from the lower surface of windshield 1 can be readily effected by means of linking elements, e.g., levers 6, between ring mould 2 and extra frame 3. The extra frame 3 can be located inside or outside, or if necessary, on both sides of the ring mould 2.

The degree of edge stress can also be adjusted by the regulation of cooling rate, e.g., in the case of FI Patent 68390, by the speed of a ring-mould shifting hoist as well as by the temperature of a station located below the hoist. The station located below the hoist can be supplied with cooling air, e.g., by means of small fans or blowers, located outside the furnace and possibly controlled, e.g., by means of thermoelements.

An extra frame 3 fastened to bending mould 2 can be used to create an edge stress for each particular grade of glass. By virtue of the invention, there is no need for complicated external control equipment for each particular mould. The invention is applicable both to miscellaneous production and to long series, nor does it require extra time for replacing a mould. The apparatus is simple and inexpensive in its construction. By means of the invention it is possible to create a uniform pattern of edge stress over the entire peripheral area.

The extra frame 3 is preferably dimensioned in a manner that the major dimension of its cross-section extends in the direction of a glass sheet and the minor dimension in the direction perpendicular thereto. In the present case, the extra frame 3 is cross-sectionally in the shape of a flat rectangle. The glass-oriented dimension of an extra frame is typically with the range of 1–5 cm, e.g., appr. 3 cm. The location of extra frame 3 is selected in a manner that its distance from the lower surface of windshield 1 is within the range of 1–8 mm, typically appr. 3 mm. It is obvious that the invention is not limited to the described design or dimensions, which are only intended to illustrate the invention. Many other embodiments are conceivable within the scope of the annexed claims.

What is claimed is:

1. A method for developing an edge stress in a glass sheet in a glass sheet bending furnace, comprising the steps of:

supporting a glass sheet on a ring mould;

heating the supported glass sheet so that bending of the glass sheet occurs;

maintaining, at least during heating and bending of the glass sheet, substantially homothermal temperature conditions in an edge area of the glass sheet around an entire periphery of the glass sheet, the substantially homothermal temperature conditions being maintained with a metallic frame disposed adjacent to the ring mold and immediately beneath, but not contacting, the edge area of the glass sheet as it is heated and bent; and developing a uniform compression stress in the edge area of the glass sheet after bending by causing cool air to flow around edges of the glass sheet while the metallic frame is disposed immediately beneath, but not contacting, the edge area of the glass sheet, the metallic frame maintaining substantially homothermal temperature conditions in the edge area of the glass sheet around the entire periphery of the glass sheet as the uniform compression stress is developed.

2. A method as set forth in claim 1, comprising the further step of adjusting a width of the glass-edge compression stress by varying a distance of the metallic frame from the glass sheet.

3. A method as set forth in claim 1, wherein a distance of the metallic frame from the glass sheet is less than a dimension of the metallic frame facing the glass sheet.

4. An apparatus for developing an edge stress in a glass sheet in a glass sheet bending furnace, the apparatus comprising:

a ring mould for supporting a glass sheet;

extra frame means disposed adjacent to the ring mould such that the extra frame means substantially covers and is located immediately beneath, but not in contact with, a lower surface of an edge area of the glass sheet supported by the ring mould, around an entire periphery of the glass sheet;

means for causing cooling air to flow around edges of the glass sheet after bending so that a compression stress is produced in the edge area of the glass sheet; and the extra frame means maintaining the edge area of the glass sheet under substantially homothermal temperature conditions when the glass sheet is heated and bent, the extra frame means further maintaining the edge area of the glass sheet under substantially homothermal temperature conditions as the compression stress is produced in the edge area of the glass sheet so that a uniform compression stress is produced in the edge area around the entire periphery of the glass sheet.

5. An apparatus as set forth in claim 4, wherein a the extra frame means is wider in a direction substantially parallel to the glass sheet than in a direction substantially perpendicular to the glass sheet.

6. An apparatus as set forth in claim 5, wherein the extra frame means is substantially rectangular in cross-section.

7. An apparatus as set forth in claim 4, wherein the extra frame means includes an extra frame supported by means for supporting the extra frame relative to the ring mould, the extra frame being removable from the supporting means and being interchangeable on the supporting means with another extra frame.

8. An apparatus as set forth in claim 4, wherein the extra frame means includes two or more frame components and means for linking the frame components.

9. An apparatus as set forth in claim 5, wherein the extra frame means is between 1–5 cm in the direction substantially parallel to the glass sheet and is disposed at a distance from a lower surface of the glass sheet between 1–8 mm.

10. A method as set forth in claim 1, comprising the further step of adjusting a width of the glass-edge compression stress by varying a dimension of the metallic frame facing the glass sheet.

11. A method as set forth in claim 10, wherein the dimension of the metallic frame facing the glass sheet is varied by pivoting the metallic frame relative to the glass sheet.

12. A method as set forth in claim 10, wherein the dimension of the metallic frame facing the glass sheet is varied by replacing a first metallic frame with a second metallic frame, the first and second metallic frames being of different sizes.

13. A method as set forth in claim 2, wherein the distance of the metallic frame from the glass sheet is varied by moving levers, the levers supporting the metallic frame relative to the ring mould.

14. An apparatus as set forth in claim 7, wherein the the interchangeable extra frames supported by the supporting means have different dimensions.

15. An apparatus as set forth in claim 4, further comprising means for pivoting the extra frame means relative to the ring mould.

16. An apparatus as set forth in claim 4, further comprising means for adjusting a distance between the extra frame means and the glass sheet.

17. An apparatus as set forth in claim 9, wherein the extra frame means is approximately 3 cm in the direction substantially parallel to the glass sheet and is disposed at a distance from the lower surface of the glass sheet of 3 mm.

18. An apparatus as set forth in claim 4, wherein the extra frame means is disposed inside of an area defined by the ring mould.

19. An apparatus as set forth in claim 4, wherein the extra frame means is disposed outside of an area defined by the ring mould.

20. An apparatus as set forth in claim 4, wherein the extra frame means includes a first extra frame disposed inside of an area defined by the ring mould and a second extra frame disposed outside of the area defined by the ring mould.

* * * * *